United States Patent Office 3,370,972
Patented Feb. 27, 1968

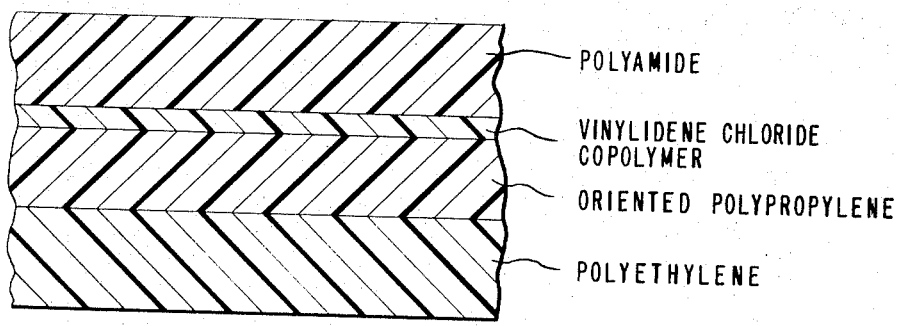

3,370,972
COATED BIAXIALLY ORIENTED
POLYPROPYLENE FILM
Herbert Nagel, Wilmington, Del., and James M. Quinn,
Tonawanda, N.Y., assignors to E. I. du Pont de
Nemours and Company, Wilmington, Del., a corporation of Delaware
Filed Sept. 11, 1964, Ser. No. 395,699
5 Claims. (Cl. 117—7)

This invention relates to heat sealable transparent film for vacuum and gas packaging. More particularly, this invention is directed to a composite film structure having separate layers of polypropylene, polyethylene and a polyamide.

A considerable amount of work has been carried out to develop a satisfactory vacuum packaging film. Although some films are more or less acceptable for vacuum packing operations when a relatively shallow drawdown, such as one or one and a half inch, is required, the need continues for a vacuum or gas packing film which has the necessary combined properties of good barrier properties, high durability, heat sealability and handleability and furthermore which will be satisfactory for deep drawdown operations, such as on the order of two and a half inches or even more.

The film of the present invention comprises a biaxially oriented polypropylene film about 0.75–2 mils thick having on one surface a layer 0.07–0.2 mil thick of a copolymer of 60–95 parts by weight of vinylidene chloride and 5–40 parts by weight of an alkyl acrylate wherein the alkyl group has 1–3 carbons and, based on the weight of the copolymer, 1–10% of acrylic acid. On top of the copolymer layer is a top coating 0.5–3.0 mils thick of a polymer of hexamethylene adipamide and/or hexamethylene sebacamide. On the reverse side of the polypropylene layer is a layer 0.5–3.0 mils thick of branched polyethylene resin.

The film is illustrated schematically in the attached self-explanatory drawing wherein the thicknesses are not necessarily drawn to scale.

Optionally, a second intermediate layer of the vinylidene chloride-alkyl acrylate copolymer can be used between the polypropylene layer and the polyethylene layer.

The composite film structure of this invention is a highly durable, readily heat sealable transparent film suitable for rigorous vacuum and gas packaging operations and characterized by deep drawability and low permeability to oxygen and moisture vapor. It is particularly suitable for automatic and semi-automatic machine packaging operations.

The polypropylene film layer is biaxially oriented according to known techniques. The film ordinarily will have been oriented by stretching from two to ten times and preferably about five times its original dimensions in the machine and transverse directions. Preferably the film after stretching is given a heat treatment at 120°–150° C. for about 1–10 seconds while permitting the film to retract between 10% and 30% in its transverse direction dimension and up to 15% in its machine direction dimension, followed by additional stretching in the machine direction of 0.5–5% at 100°–150° C. Preparation of such polypropylene film is described in Hovermale and Rae U.S. Patent 3,257,490. The film preferably is characterized by a sheet flatness as measured by droop, of no greater than ¼-inch droop at one pound of tension per inch of film width, and a dimensional stability, as measured by shrinkage, of no greater than 5% shrinkage in either of the machine or transverse directions when heated at 130° C. for one minute.

The polypropylene film should be treated to render the surfaces more readily adherable to polymeric coatings. A preferred treatment for this purpose is described in Wallenfels U.S. pending patent application Serial No. 231,218 filed October 17, 1962, now abandoned and commonly assigned with this application. Such treatment involves passing the biaxially oriented polypropylene film through a flame emanating from the discharge opening of a burner supplied with a gaseous mixture of a hydrocarbon fuel and oxygen-enriched air, the fuel being a paraffinic or olefinic hydrocarbon, the fuel equivalence ratio of the gaseous mixture supplied to the burner being between 0.85 and 1.15, the oxygen ratio of the gaseous mixture being between 0.25 and 0.30, the path of the film as it traverses the flame from the burner being located at a distance from the burner less than the length of the unimpeded primary envelope of the flame but not less than the distance below which the velocity of the burning gases escaping from the immediate vicinity of the discharge opening exceeds the burning velocity of the flame, the surface on which the film is supported as the film traverses the flame being maintained at a temperature between 50° C. and 80° C., and the exposure of the film to the action of the flame being for a time between 0.0005 second and 0.1 second whereby the contact angle of the film surface being treated is lowered to a value below 65°.

As mentioned above, the polypropylene film should be at least 0.75 mil thick but can be as great as 1.5 mils, 2.0 mils and even greater. Film thicknesses in the range of 0.75 mil to 1.0 mil are preferred because of their adequate strength without exceeding economic requirements.

The vinylidene chloride copolymer should contain between 60 and 95 parts by weight, preferably between 78 and 90, of vinylidene chloride, between 5 and 40 parts by weight, preferably between 10 and 22, of an alkyl acrylate wherein the alkyl group has from 1 through 3 carbon atoms and based on the weight of the copolymer between 1 and 10% of the acrylic acid. The thickness of the vinylidene copolymer coating will be between 0.07 and 0.2 mil thick with coatings in the range of 0.08 and 0.12 mil thickness being preferred. If the film coating is thinner than this, barrier properties would be impaired; if the coating is thicker than the limit shown, brittleness occurs.

The vinylidene chloride copolymer layer is also preferably treated for adherability, preferably by the flame treatment described above.

The polyamide layer comprises a polyamide selected from the group consisting of polyhexamethylene adipamide and polyhexamethylene sebacamide and copolymers thereof such as hexamethylene adipamide/hexamethylene sebacamide and hexamethylene adipamide/hexamethylene sebacamide/caprolactam copolymers, the polyamides having a relative viscosity of at least 100. The preferred polyamide is a polyhexamethylene sebacamide of relative viscosity at least 150, based on formability and durability as measured by resistance. A minimum thickness of 0.5 mil of the polyamide is necessary to insure satisfactory drawability of the composite structure. Thicknesses greater than 2 mils are not detrimental but add to the cost of the product and do not greatly increase performance characteristics.

By "branched" polyethylene is meant polyethylene having a density of less than about 0.935 gram/cc. at 25° C.

By way of exemplary illustration, a composite film of this invention was prepared using a 5× by 5× biaxially oriented polypropylene film one mil thick which had been heat set in accordance with the abovementioned Hovermale & Rae process and flame treated in accordance with the above-mentioned Wallenfels process. To this film was applied a 40% solids aqueous dispersion of 80 parts by weight of vinylidene chloride, 20 parts by weight of methyl acrylate and, based on the combined weight of vinylidene chloride and methyl acrylate, 4% of acrylic acid. Coating weight on each surface was 3 grams per square meter, corresponding to a thickness of about 0.1 mil. The coated film was submitted to a second flame treatment and thereafter one surface was melt coated at 250° C. with a one mil thick layer of polyhexamethylene sebacamide resin having a relative viscosity of 180, (ratio of viscosity of 8.4% solution of polyamide in formic acid at 25° C. to viscosity of formic acid at 25° C. The other surface of the polypropylene was melt coated with a 2 mil thick layer of branched polyethylene (Du Pont "Alathon" polyethylene resin). The resulting film structure was then subjected to the following experiments.

*Formability*

The film structure was subjected to draw depth of 2½ inches on a Sureflow 7-17F vacuum packaging machine (Standard Packaging Co.) operating at a temperature of about 600° F. The film bearing the one mil thick layer of polyamide showed no evidence of rupture in the deep draw. Similar films with a 0.5 mil thick polyamide layer also drew this deeply without fracture but with polyamide layers less than 0.5 mil thick rupture of the film occurred.

As a control, a polyethylene terephthalate film coated with a vinylidene chloride copolymer and with a polyethylene top coat, which corresponds to a commercially available vacuum packaging film, could not be drawn more than 1¾ inches without rupture. Neither film coated with vinylidene chloride copolymer could be deep drawn without rupture.

Additional test films made with a one mill thick layer of polyamide shown in the following table also withstood a 2½ inch draw without rupture.

| Polyamide: | Relative viscosity |
|---|---|
| Polyhexamethylene adipamide | 225 |
| Polyhexamethylene adipamide/polyhexamethylene sebacamide (50/50) | 110 |
| Polyhexamethylene sebacamide | 50 |

*Durability*

One of the problems met in the vacuum packaging field is failure of the package in the course of shipping and handling. A test to simulate this wear experience of a film was carried out as follows. The test was carried out on a sand blast abrasion tester built by Pressure Blast Manufacturing Co. and modified so as to hold the sample in a firm position with adjustable angle of exposure.

Film samples 6½" by 2" were mounted on a ⅜" by 2½" by 4" backing board with a 2½" square area painted black for better observation of failures. Samples after forming (in this case, 2½" deep by 5" in diameter) were cut and mounted tightly with the aid of masking tape. The machine direction of film sample was mounted so it was vertical to the direction of blast.

The mounted samples were placed in the machine on the holder and the blast exposure-angle set at 45°. The sample distance from the blast nozzle was maintained at 2⅛". Air pressure of 60-70 p.s.i. was used to blast the abrasive (No. 600 wet blast brite) against the sample. At time of failure the sample "balloons" and the abrasive appears between the film and black backing board. Results are expressed in terms of average time to failure in seconds. Test results are shown in tabular form below.

| Film* | Time to failure |
|---|---|
| BPE/VCl$_2$/OPP/VCl$_2$/Ny(1) | 142 |
| BPE/VCl$_2$/OPP/VCl$_2$/Ny(2) | 99 |
| BPE/VCl$_2$/OPP/VCl$_2$/Ny(3) | 48 |
| BPE/VCl$_2$/OPP/VCl$_2$/Ny(4) | 2 |
| BPE/VCl$_2$/PT | 27 |

Legend:
  BPE—branched polyethylene
  OPP—oriented polypropylene
  VCl$_2$—vinylidene chloride copolymer
  Ny(1)—polyhexamethylene sebacamide — relative viscosity 180
  Ny(2)—polyhexamethylene adipamide—relative viscosity 225
  Ny(3) — polyhexamethylene adipamide/polyhexamethylene sebacamide (50/50)—relative viscosity 110
  Ny(4)—polyhexamethylene sebacamide — relative viscosity 50
  PT—polyethylene terephthalate
* Underlined surface exposed to sand blast.

*Barrier properties*

The various test film of the type BPT/VCl$_2$/OPP/VCl$_2$/Ny all show very low oxygen permeabilities, on the order of 0.5 cc./100 sq. in./24 hours, which is comparable to the permeability of the commercial film BPE/VCl$_2$/PT.

Tests have also demonstrated that the barrier properties of the BPE/VCl$_2$/OPP/VCl$_2$/Ny composite are well retained as the film is stretched in the vacuum forming operation. A film of this type when stretched approximately 2× by 2× to correspond with the stretch it would receive in forming a 2½ inch deep cup on a forming machine had the following characteristics:

| | Initially | After Stretching |
|---|---|---|
| Thickness, mils | 4.2 | 0.8 |
| Oxygen permeability (gram per 100 square meters per hour) | 0.3 | 0.9 |
| Oxygen permeability (gram per 100 square meters per hour per mil) | 1.26 | 0.7 |

Although the permeability value of the stretched film (0.9) is somewhat higher than for the same film before stretching (0.3), it is still sufficiently low to provide effective barrier properties for packaging purposes.

*Heat sealing characteristics*

The test films heat sealed with the BFE surface of one sheet to the BPE surface of another form hermetic weld seals, also comparable to the sealing performance of the commercial film.

The test films heat sealed with the BFE surface of one available vacuum packaging films particularly in respect to drawability and durability performance. They provide excellent barrier properties, they can be readily sealed for hermetic packages and permit effective product display through their high transparency. They are also adaptable in other thermoforming techniques for blister packaging and the like.

The invention claimed is:
1. A film structure comprising a biaxially oriented polypropylene film about 0.75–2 mils thick having on one surface a layer about 0.07–0.2 mil thick of a copolymer of 60–95 parts by weight of vinylidene chloride and 5–40 parts by weight of an alkyl acrylate wherein the alkyl group has 1 through 3 carbons and, based on the weight of the copolymer, 1–10% of acrylic acid; having on said copolymer layer a coating 0.5–3.0 mils thick of a polyamide having a relative viscosity of at least 100 and selected from the group consisting of polyhexamethylene adipamide, polyhexamethylene sebacamide and copolymers thereof; and having on the other surface of the polypropylene film a layer about 0.5–3.0 mils thick of polyethylene having a density of less than about 0.935 gram/cc. at 25° C.
2. A film structure as set forth in claim 1 wherein said polyamide is polyhexamethylene adipamide.
3. A film structure as set forth in claim 1 wherein said polyamide is polyhexamethylene sebacamide.

4. A film structure as set forth in claim 1 wherein said polyamide is a 50—50 copolymer of hexamethylene adipamide and hexamethylene sebacamide.

5. A film structure as set forth in claim 1 wherein said polypropylene film is oriented about 5 times in each of the machine and transverse directions.

References Cited

UNITED STATES PATENTS

| 2,627,088 | 2/1953 | Alles et al. | 117—7 X |
|---|---|---|---|
| 3,251,817 | 5/1966 | Hahn et al. | 117—138.8 X |
| 3,255,034 | 6/1966 | Covington et al. | 117—7 X |
| 3,262,805 | 6/1966 | Aoki | 117—76 X |
| 3,286,009 | 11/1966 | Yumoto et al. | 117—7 X |
| 3,287,446 | 11/1966 | Koch | 117—138.8 X |
| 3,309,330 | 3/1967 | Settlage | 117—138.8 X |

WILLIAM D. MARTIN, *Primary Examiner.*

MURRAY KATZ, *Examiner.*

J. E. MILLER, JR., *Assistant Examiner.*